(No Model.)
G. B. SNOW.
GAS REGULATOR FOR VULCANIZERS.
No. 511,256. Patented Dec. 19, 1893.
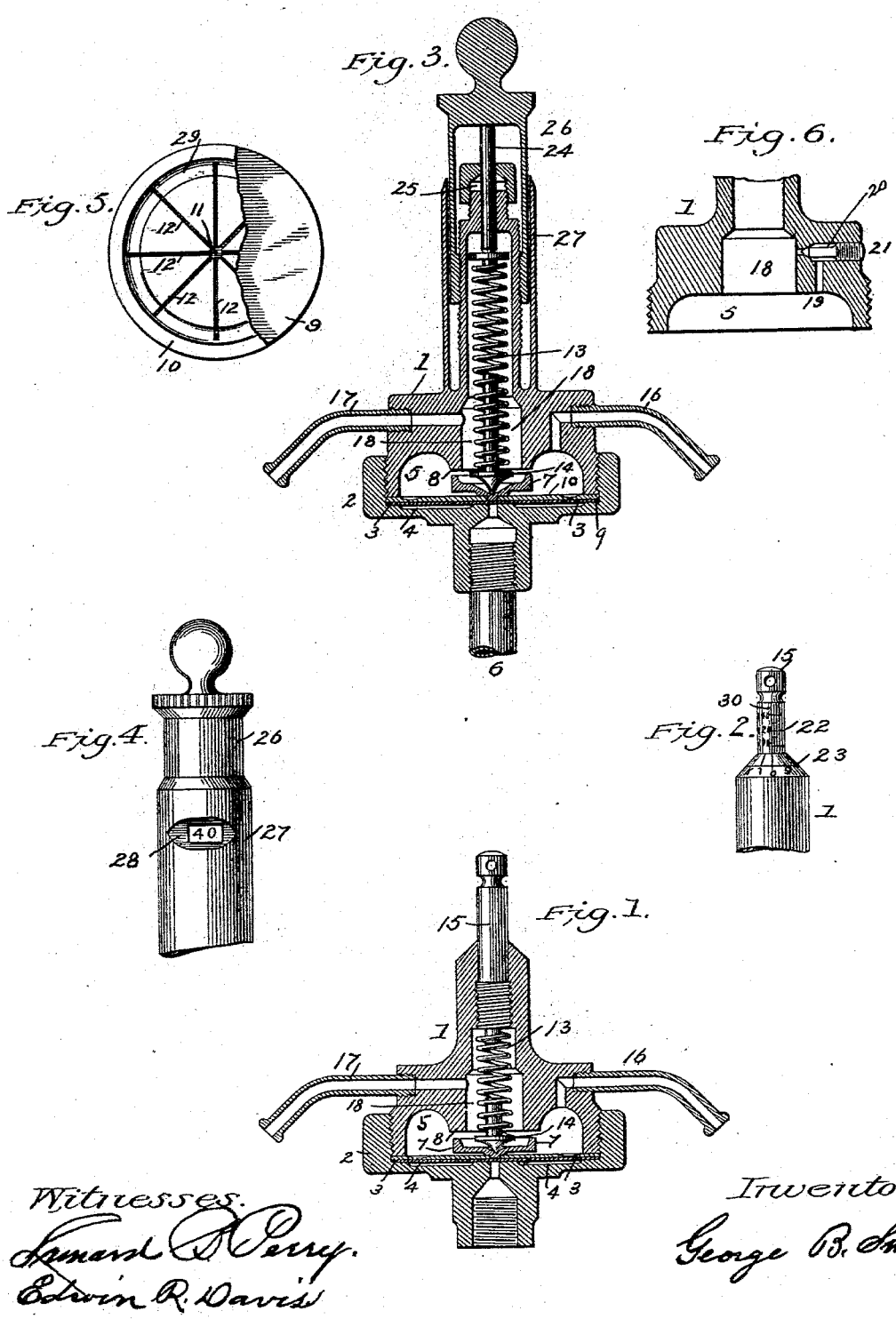
Witnesses.
Samuel D. Perry.
Edwin R. Davis
Inventor.
George B. Snow

UNITED STATES PATENT OFFICE.

GEORGE B. SNOW, OF BUFFALO, NEW YORK.

GAS-REGULATOR FOR VULCANIZERS.

SPECIFICATION forming part of Letters Patent No. 511,256, dated December 19, 1893.

Application filed July 8, 1893. Serial No. 479,969. (No model.)

*To all whom it may concern:*

Be it known that I, GEORGE B. SNOW, of the city of Buffalo, in the county of Erie and State of New York, have invented certain new and useful Improvements in Gas-Regulators for Vulcanizers, of which the following is a specification, reference being had to the accompanying drawings, in which—

Figure 1 is a vertical central section of a gas regulator embodying my invention. Fig. 2 is an elevation of the upper part of the regulator shown in Fig. 1, showing one manner of applying an index thereto. Fig. 3 is a vertical central section of a similar regulator, with the addition of a stuffing-box, and another form of index. Fig. 4 is an elevation of the upper part of the regulator shown in Fig. 3, showing more plainly the index feature thereof. Fig. 5 is a view, in plan, of the diaphragm which I prefer to use in constructing this form of regulator. Fig. 6 is a vertical central section of a portion of a regulator body, showing a by-pass screw and passages.

This invention relates to apparatus employed in connection with vulcanizers, by means of which the flow of the gas used to heat the same is automatically controlled, so that the temperature of the vulcanizer shall not be allowed to exceed a certain predetermined point; thus dispensing with the necessity of of any supervision from the person in charge. Its object is, the production of an apparatus which shall be more sensitive in action, and more easy of adjustment than those heretofore used for the purpose. Its object is also the production of an apparatus which shall be capable of adjustment at any time, even before the vulcanizer is heated, and without reference to a thermometer, steam-gage, or other means of gaging heat or steam pressure, to hold the temperature of the vulcanizer at any point desired.

Gas regulators for controlling the flow of gas used for heating vulcanizers have been heretofore made, in which entire dependence has been placed upon the diaphragm for offering a yielding resistance to the steam pressure and operating the valve for turning down the flow of gas. The valve movement has in consequence been so slow that the regulator has been subject to derangement from slight causes.

My improvement consists in the employment of a diaphragm fitted to give the requisite movement to the valve, but purposely weakened so as to be unable of itself to resist the steam pressure, in combination with a stiff spring; the resistance of which holds the valve open until the steam pressure has nearly attained the point at which the valve is designed to close; the movement of the valve being thus made quicker and more certain.

It also consists in the combination with the diaphragm, valve, and compressing spring, of an index; whereby the regulator may be quickly and easily set to hold the vulcanizer at any steam pressure desired.

The body or casing of my device is made in two concave sections, 1 and 2, which may be either bolted or screwed together. Between them is tightly held a diaphragm, 3, by which the cavity formed between the two sections is divided into a steam chamber, 4, and a gas chamber, 5. The steam pipe, 6, conducts steam from the vulcanizer to the steam chamber, and also serves to connect the regulator thereto. A valve, 7, is placed in the gas chamber, 5, resting centrally upon the diaphragm 3. It is evident that the valve will be raised by the bulging of the diaphragm when it yields to the steam pressure, and will come in contact with the seat 8, formed upon the lower face of section 1 of the casing.

Any flexible diaphragm of sufficient strength to resist the steam pressure may be employed, but I prefer the one shown in the drawings, which consists of the thin copper plate 9, superimposed upon which is the spring brass reinforcing plate 10. This brass plate 10, has a circular orifice 11, in its center, from which a series of radial cuts 12, are made, extending from the open center 11, nearly to the edge of the plate; thus adding to its elasticity. An annular groove 29 is cut near the outer edge of the brass plate 10, to increase its flexibility and confine it to this point. As the central portions of the diaphragm are stiff, its movement under pressure is all referred directly to its center, upon which the valve 7, rests; no part of the movement being lost by bending of the diaphragm between its center and periphery; as is the case when one of uniform thickness is employed. Pressure is exerted upon the valve 7 by means of the spiral spring 13, which bears upon its center by means of the pointed step, 14. The adjusting screw, 15, bears upon the upper end of the spring 13, and the latter is thereby compressed, and a proper amount of pressure brought to bear upon the valve 7 to hold it open until the predetermined steam pressure in the vulcanizer has been attained.

A gas inlet, 16, is provided, through which gas enters the gas chamber, 5, and a gas outlet, 17, through which it escapes from the central cavity, 18, in the casing, 1, which contains the spring 13. As the only passage from one to the other is between the valve 7 and its seat 8, it is evident that the flow of gas will be controlled by the steam pressure in the steam chamber, 4, whenever it is high enough to overcome the resistance of the spring 13, and force the valve, 7, against its seat. It is also evident that a full opening of the valve will be maintained, until the resistance of the spring is overcome by the steam pressure, and that the valve will then close quickly; its sensitiveness of action depending upon the length and elasticity of the spring 13.

To prevent the flow of gas from being entirely checked, so as to extinguish the flame, I show in Fig. 6 an adjustable by-pass; through which a small quantity of gas is allowed to pass from the gas chamber 5 to the central cavity 18. It consists of the passages 19 and 20, and the pointed screw 21, which can be adjusted to partially or entirely close the passage 20. Provision is thus made for the varying pressure of the gas supply, which, with illuminating gas, is usually rated at one inch of water, while with natural gas, it is often several ounces to the square inch. While not absolutely essential to the operation of the regulator, the by-pass above described is a valuable addition thereto.

The apparatus, constructed as above described, may be adjusted as follows: The spring 13 being strongly compressed by the adjusting screw 15, the thermometer, or steam gage, as the case may be, which is attached to the vulcanizer, is watched until it indicates the desired heat or pressure; when the screw 15 is slackened off until the pressure of the steam in the vulcanizer is able to overcome the resistance of the spring 13 and close the valve 7 to that degree that the flame under the vulcanizer is barely sufficient to maintain its heat. Being thus adjusted, the regulator will operate, and hold the vulcanizer at the same temperature or pressure for any number of subsequent vulcanizations; but if a change in this temperature is desired, the regulator must be re-set in the manner just described.

To render the apparatus capable of instantaneous adjustment at any time, I provide it with the index shown in Fig. 2. The pitch of the thread of the adjusting screw 15 is so proportioned to the strength of the spring 13, that one turn downward of the screw will be equivalent to ten pounds to the inch additional steam pressure in the steam chamber 4. Graduations 22 are made upon the shank of the screw 15, at intervals corresponding to the pitch of its thread, and the end of the sleeve of the casing 1, through which the screw 15 projects, is divided into ten equal parts, 23, to register with a vertical line drawn upon the shank of the screw 15, which forms an abscissa 30 for the graduations 22 thereupon. It is now possible to adjust the regulator to maintain any desired temperature or pressure in the vulcanizer, at any time; even before the vulcanizer is heated; and after the flame is lighted thereunder, it needs no attention whatever from the dentist until vulcanization is complete.

To prevent the leakage of gas, which might occur through the threads of the adjusting screw 15, I contemplate the addition of a stuffing-box, in the manner shown in Fig. 3. The spring 13 is compressed by the push pin 24, which passes through the stuffing-box 25, formed upon the upper part of the casing 1. The adjusting screw is in the form of a screw cap, 26, the upper portion of the casing 1 being exteriorly threaded for its reception. A sleeve, 27, attached to the section 1, covers the lower portion of the screw cap 26, and figures, denoting the pounds pressure, or temperature, as desired are stamped or engraved upon the exterior of the cap 26; and are visible successively at the peep-hole 28, in the sleeve 27. By making the thread of the cap 26 of a coarser pitch than that specified for the adjusting screw 15, the figures upon the cap 26 will be disposed spirally, and plenty of room can thus be made for them.

I do not confine myself to the precise forms of index above described, as other forms thereof can readily be adapted to my regulator, without departure from the spirit of my invention.

Having thus described my improved gas-regulator, I claim as my invention—

1. A gas regulator for controlling the flow of gas used for heating a vulcanizer; consisting essentially of a hollow casing provided with suitable inlet and outlet passages, a flexible diaphragm acted upon by the steam pressure of the vulcanizer, and dividing the cavity within said casing into a steam chamber and a gas chamber, a valve located centrally upon the gas side of the diaphragm, and closing upon an annular seat formed upon the interior of the casing, a spring pressing upon the valve, and an adjusting screw for varying the pressure of the spring upon the valve; thus enabling it to operate under different steam pressures; substantially as hereinbefore set forth.

2. A gas regulator for controlling the flow of gas used for heating a vulcanizer; consisting essentially of a hollow casing provided with suitable inlet and outlet passages, a flexible diaphragm acted upon by the steam pressure of the vulcanizer, and dividing the cavity within said casing into a steam chamber and a gas chamber, a valve located centrally upon the gas side of the diaphragm and closing upon an annular seat formed upon the interior of the casing, an adjustable passage for supplying gas to the burner when the valve is closed, a spring pressing upon the valve, and an adjusting screw for varying the pressure of the spring upon the valve; substantially as hereinbefore set forth.

3. A gas regulator for controlling the flow of gas used for heating a vulcanizer; consisting essentially of a chamber through which the gas passes to the burner, a diaphragm of thin flexible metal acted upon by the steam pressure of the vulcanizer and surmounted by a plate of stiff metal provided with radial cuts starting from its open center and terminating in a circular groove near its edge, a spring pressed valve acted upon by the diaphragm, and an adjusting screw for varying the pressure of the spring upon the valve and controlling the supply of gas to the burner; substantially as hereinbefore set forth.

4. A gas regulator for controlling the flow of gas used for heating a vulcanizer; consisting essentially of a chamber through which the gas passes to the burner, a diaphragm of thin flexible metal acted upon by the steam pressure of the vulcanizer and surmounted by a plate of stiff metal provided with radial cuts starting from its open center and terminating in a circular groove near its edge, a spring pressed valve acted upon by the diaphragm, an adjusting screw for varying the pressure of the spring upon the valve, and an index for showing the amount of pressure exerted by the adjusting screw; substantially as hereinbefore set forth.

5. A gas regulator for controlling the flow of gas used for heating a vulcanizer; consisting essentially of a hollow casing provided with suitable inlet and outlet passages, a flexible diaphragm acted upon by the steam pressure of the vulcanizer, and dividing the cavity within the casing into a steam chamber and a gas chamber, a valve located centrally upon the gas side of the diaphragm and closing upon an annular face formed upon the interior of the casing, a spring pressing upon the valve, an adjusting screw for varying the pressure of the spring, and an index for showing the amount of pressure exerted thereby; substantially as hereinbefore set forth.

6. A gas regulator for controlling the flow of gas used for heating a vulcanizer; consisting essentially of a hollow casing having inlet and outlet passages for gas and a steam inlet, a flexible diaphragm acted upon by the steam pressure of the vulcanizer and dividing the cavity within the casing into a steam chamber and a gas chamber, a valve located centrally upon the gas side of the diaphragm and seating upon an annular face formed upon the interior of the casing, an adjustable passage for supplying gas to the burner when the valve is closed, a spring pressing upon the valve, an adjusting screw for varying the pressure of the spring, and an index for showing the amount of pressure exerted thereby; substantially as hereinbefore set forth.

7. A gas regulator for controlling the flow of gas used for heating a vulcanizer; consisting essentially of a hollow casing having inlet and outlet passages for gas, and a steam inlet, a flexible diaphragm acted upon by the steam pressure of the vulcanizer and dividing the cavity within the casing into a steam chamber and a gas chamber, a valve located centrally upon the gas side of the diaphragm and seating upon an annular face formed upon the inside of the casing, a spring pressing upon the valve, a push-pin passing through a stuffing box in the casing and compressing the spring, a screw cap for operating the push-pin and an index thereupon; substantially as hereinbefore set forth.

8. In a gas regulator for controlling the flow of gas used for heating a vulcanizer, a diaphragm of thin flexible metal surmounted by a plate of stiff metal provided with radial cuts starting from its center, and terminating in a circular groove formed near its edge; substantially as hereinbefore set forth.

GEORGE B. SNOW.

Witnesses:
LEONARD B. PERRY,
EDWIN R. DAVIS.